United States Patent [19]

Soderlund et al.

[11] Patent Number: 5,611,476

[45] Date of Patent: Mar. 18, 1997

[54] SOLDER REFLOW CONVECTION FURNACE EMPLOYING FLUX HANDLING AND GAS DENSIFICATION SYSTEMS

[75] Inventors: Martin I. Soderlund, Westborough; Francis C. Nutter, Methuen, both of Mass.; Robert P. Couilliard, Plaistow, N.H.; Pierre J. LeMieux, Andover; Arthur Waugh, Winchester, both of Mass.

[73] Assignee: BTU International, No. Billerica, Mass.

[21] Appl. No.: 588,101

[22] Filed: Jan. 18, 1996

[51] Int. Cl.$^6$ .................................................. B23K 3/00

[52] U.S. Cl. ............................................. 228/42; 228/223

[58] Field of Search ........................... 228/42, 43, 219, 228/223; 432/23, 66; 34/79, 469

[56] References Cited

U.S. PATENT DOCUMENTS

| | | | |
|---|---|---|---|
| 4,203,734 | 5/1980 | Winter et al. | 55/26 |
| 4,345,814 | 8/1982 | Gutbier et al. | 339/275 R |
| 4,403,949 | 9/1983 | March et al. | 432/29 |
| 4,580,716 | 4/1986 | Barresi et al. | 228/219 |
| 4,594,266 | 6/1986 | Lemaire et al. | 427/55 |
| 4,614,229 | 9/1986 | Oldweiler | 165/115 |
| 4,661,173 | 4/1987 | Barajas et al. | 148/24 |
| 4,800,362 | 1/1989 | Sasaki et al. | 340/78 |
| 4,801,069 | 1/1989 | Ankrom et al. | 228/180.2 |
| 4,802,276 | 2/1989 | Bowcutt et al. | 29/739 |
| 4,840,305 | 6/1989 | Ankrom et al. | 228/232 |
| 4,909,429 | 3/1990 | Ankrom et al. | 228/57 |
| 5,347,103 | 9/1994 | LeMieux | 219/400 |
| 5,364,447 | 11/1994 | Philipp et al. | 75/500 |
| 5,472,135 | 12/1995 | Taniguchi et al. | 228/219 |

Primary Examiner—Samuel M. Heinrich
Attorney, Agent, or Firm—Weingarten, Schurgin, Gagnebin & Hayes LLP

[57] ABSTRACT

A solder reflow convection furnace employing flux collection and heating to minimize flux and solvent build up and gas densification to reduce input gas flow is disclosed. As solder melts in the furnace, an effluent of vaporized flux is driven off and can condense on cooler components. To minimize such condensation, the gas is directed through a cooling system in which the flux condenses, and the cooled, cleaned gas is directed into the furnace's product cooling section. In another embodiment, in which the gas in the furnace is recirculated, a cooling coil is located upstream of the recirculating gas mover to heat the primary gas. The vaporized flux condenses on the cooling coil, which can be readily removed and replaced. In another aspect of the invention, when the furnace employs a gas amplifier, the recirculating gas is cooled prior to reentry into the heating chamber, which increases its density and removes flux by condensation. Upon reentering the heating chamber, the cooler, denser gas undergoes a greater expansion than would return hot gas, thereby increasing the pressure in the chamber and correspondingly increasing the velocity of the output flow to the process area. The increased velocity allows reduction of consumption of the primary gas and increases the efficiency of heat transfer.

54 Claims, 12 Drawing Sheets

SOLDER REFLOW CONVECTION FURNACE EMPLOYING FLUX HANDLING AND GAS DENSIFICATION SYSTEMS

FIELD OF THE INVENTION

This invention relates to convection furnaces and more particularly to solder reflow convection furnaces.

BACKGROUND OF THE INVENTION

Convection furnaces are used for the reflowing of solder in the surface mounting of electronic devices to circuit boards. In such furnaces, boards, having preformed solder and/or solder-paste patterns on the boards and devices, travel on a conveyor through a plurality of heating zones. Circulating gas in the furnace is heated by convection heaters above and below the conveyor and impinges on the boards and devices to heat the solder to the reflowing temperature. The gas is typically circulated by fans or gas amplifiers. A cooling section downstream of the heating zones is generally used to cool the boards down from the reflowing temperature.

During solder reflow, an effluent of vaporized flux and solvents is driven from the solder paste. The vaporized flux condenses on surfaces, such as fan blades, air amplifiers, feed lines, or motor shafts, with which the flux vapor comes into contact that are below the flux condensation temperature. Periodic cleaning of the surfaces on which the flux has condensed must be undertaken. Filtration systems have also been used to help remove the flux.

A recent convection furnace design, shown in U.S. Pat. No. 5,347,103, employs gas amplifiers in lieu of fans to circulate air or other gas over the heating elements and to the boards. The gas amplifier introduces a high volume flow of gas into a sealed, pressurizable box. The flow circulates over heating elements in the box to heat the gas, which pressurizes the interior of the box. The heated gas is distributed over a plate having an array of orifices and flows through the orifices to impinge on the product on the conveyor. The gas is recirculated through a return plenum.

Gas amplifiers are based upon the Coanda effect, which describes the phenomenon in which a jet of fluid exiting from a nozzle along a surface tends to follow and adhere to the surface and entrains nearby ambient fluid as it flows. A gas amplifier comprises a body having a fluid flow passage extending therethrough from an entrance to an exit. The entrance to the passage is shaped according to a Coanda profile. A fluid under high pressure (the input) flows radially inwardly into the passage through an annular gap or space at the entrance. The width of the gap is set by a toothed spacer or shim. One surface of the gap joins and forms part of the Coanda profile of the passage through the amplifier. As the high pressure input flow exits the gap, it follows the Coanda profile into the passage and thereby entrains ambient gas (the inflow) through the entrance into its flow.

SUMMARY OF THE INVENTION

The present invention provides a convection furnace, such as for solder reflow, having a flux and solvent handling system to minimize the build up of condensed flux and solvents on components within the furnace. The circulating gas in the furnace contains vaporized flux and solvents which condense on surfaces having temperatures less than the solder flux condensation temperature, typically 200° C. for solder used in solder reflow furnaces.

In a first embodiment of the invention, a flux collection system is provided comprising a condenser box located on a flow path from a heating section to a cooling section of the furnace. A plurality of heat exchange elements are arranged in the condenser box. The heat exchange elements preferably comprise plate-like cooling elements having openings therethrough for the furnace gas and internal passages for a coolant. The elements are arranged in series with the plates generally perpendicular to a flow path. Hot gas from the heating section of the furnace is drawn through the condenser box and passes through the openings in the heat exchangers. As the gas cools, flux and solvents in the gas condense on the surface of the heat exchangers. A filter is also provided downstream of the heat exchangers to remove any particles that remain in the gas. The cooled gas is directed into a cooling section of the furnace. Preferably, the heat exchangers are readily removable from the condenser box for cleaning and replacement.

A further embodiment of the flux handling system of the present invention is particularly useful in conjunction with a gas amplifier through which gas is recirculated to prevent the build up of condensed flux and solvents on the gas amplifier. The input to the gas amplifier is generally compressed air or nitrogen and is supplied at a temperature less than the flux condensation temperature, typically room temperature. Also, the recirculating furnace gas cools somewhat prior to entering the amplifier and then expands on entering the amplifier, which cools it even further. Thus, the Coanda surface near the entrance area of the gas amplifier is bathed with a cool fluid, which is less than the flux condensation temperature. Condensed flux and solvents thus build up on the Coanda surface, eventually closing the gap sufficiently to impair operation of the gas amplifier.

In the present invention, a heat exchanger in the form of a cooling coil is provided in a conduit disposed in the recirculating flow path upstream of the gas amplifier. The input or driving fluid for the gas amplifier flows through the cooling coil. Recirculated furnace gas is forced to pass through the conduit and over the heat exchanger before entering the gas amplifier. By heat transfer with the recirculating furnace gas, the input fluid is heated prior to contact with the gas amplifier surfaces. By keeping the gases at a higher temperature, the tendency for flux and solvents to condense on the gas amplifier is further reduced.

In addition, as the air passes over the heat exchanger, flux and solvents condense on it. Thus, gas reaching the gas amplifier has been substantially cleaned of vaporized flux and solvents. When the heat exchanger becomes sufficiently coated with condensed flux and solvents, the conduit containing the heat exchanger is removed and replaced with a clean heat exchanger.

In a further embodiment, the conduit containing the heat exchanger is located upstream of a fan. Recirculated furnace gas passes over the heat exchanger prior to passing the fan, thereby causing flux and solvents to condense primarily on the heat exchanger rather than on the fan.

The present invention further provides a gas amplifier-based convection furnace, such as for solder reflow, which employs a gas densification system to reduce an input gas flow and coincidentally minimize flux and solvent build up. The gas amplifier is driven by an input flow of a primary gas, usually nitrogen, to provide a circulating flow of gas in a closed loop past a heating element in a heating chamber to a process area containing product, thereby reflowing solder on the product. Prior to reentry into the heating chamber, the gas is cooled to increase its density, and coincidentally condense flux and solvents, and filtered to remove particulates. Upon entering the heating chamber, the cooler, denser gas undergoes a greater expansion than warm gas, thereby increasing the pressure in the chamber. The increased pressure results in a corresponding increase in velocity output flow to the process area. The increased velocity reduces consumption of the primary gas and increases the efficiency of heat transfer. Additionally, flux and solvents condense on the cooling elements, thereby removing them from the recirculating gas.

DESCRIPTION OF THE DRAWINGS

The invention will be more fully understood from the following detailed description taken in conjunction with the accompanying drawings in which.

DETAILED DESCRIPTION OF THE INVENTION

Figure 1:
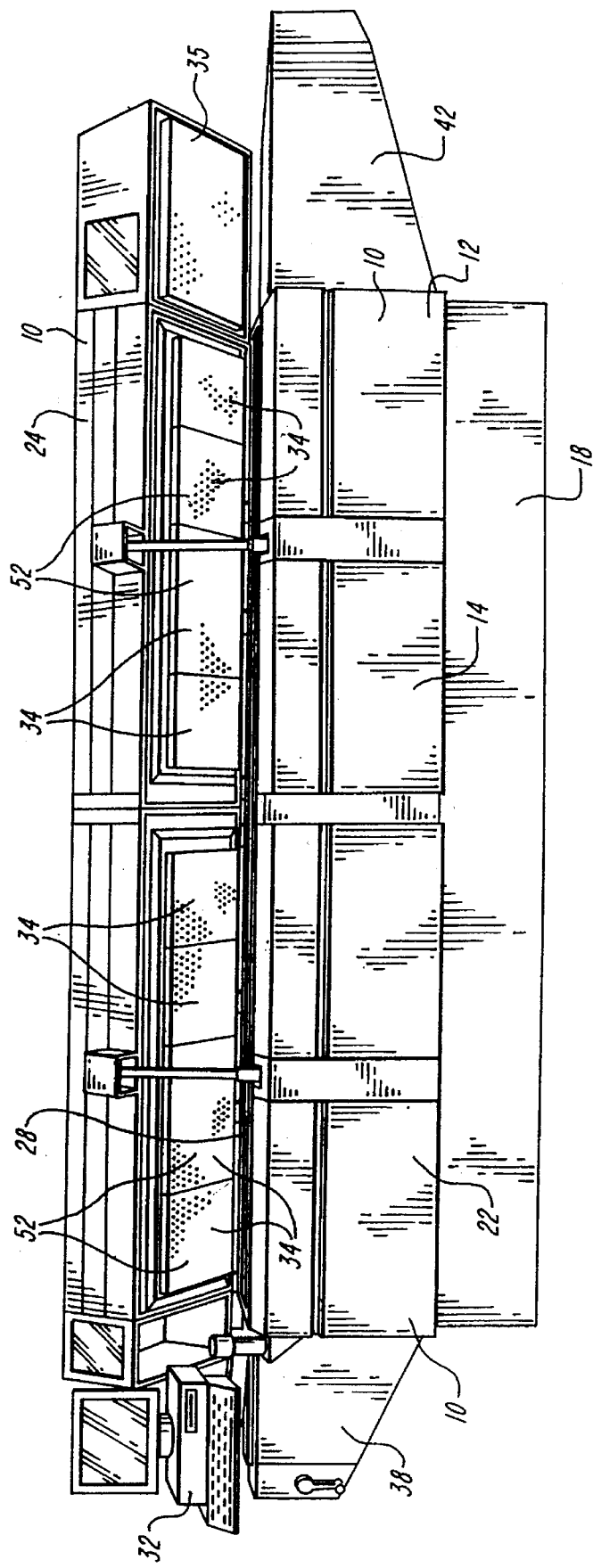
FIG. 1 is an front elevational view of a prior art solder reflow convection furnace.
Figure 2:
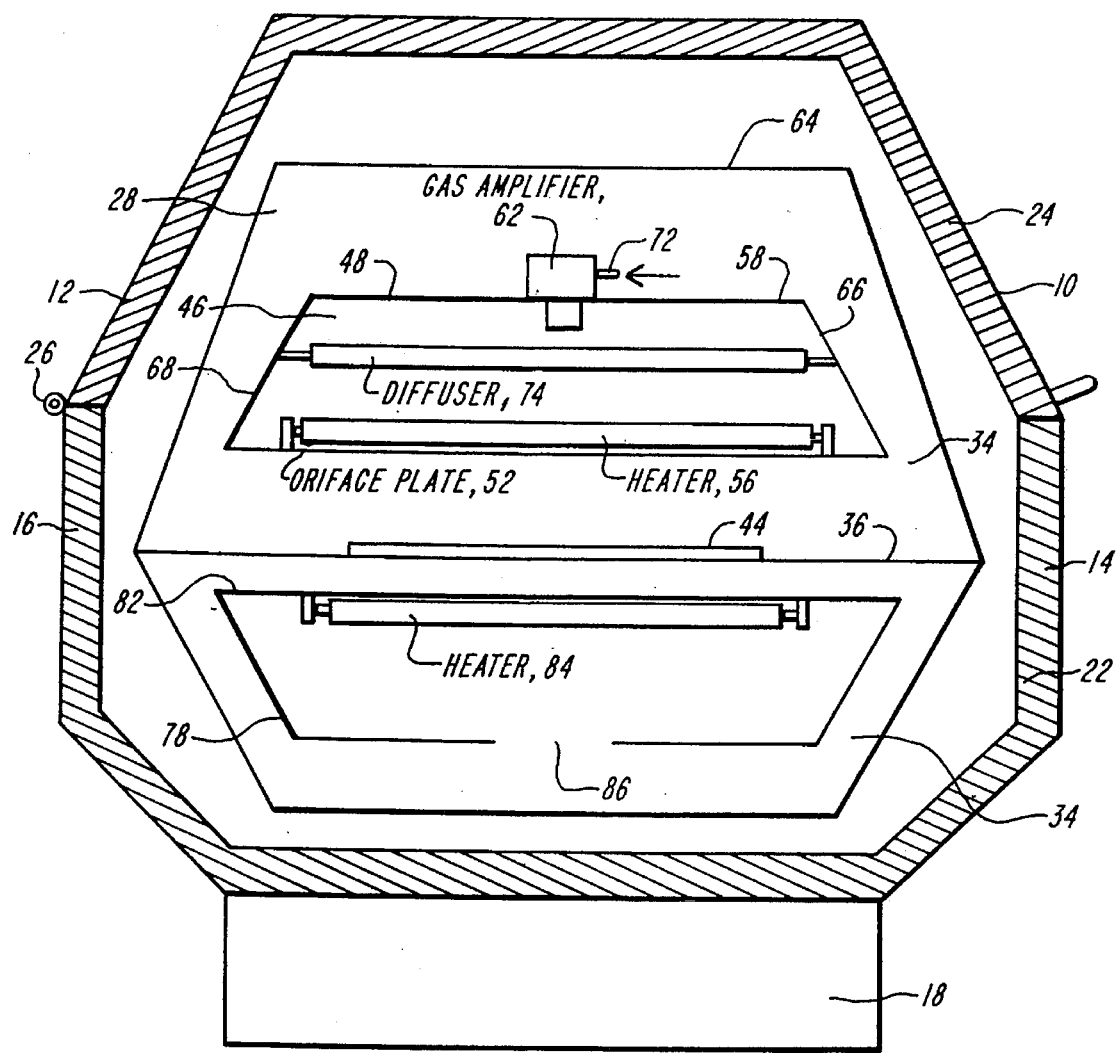
FIG. 2 is a cross-sectional side view of the prior art furnace of FIG. 1.

The flux collection and gas densification systems of the present invention will be described in relation to a recirculation impingement convection furnace 10 which employs gas amplifiers for solder reflow as shown in FIGS. 1 and 2 and described with greater particularity in U.S. Pat. No. 5,347,103, the disclosure of which is incorporated herein by reference. Such a furnace may advantageously employ a flux handling or gas densification system according to the present invention. The furnace 10 is generally elongated in the direction of product travel therethrough and comprises a thermally insulated housing 12. The housing has a generally clam shell configuration in cross-section, in which a lower housing 22 is hingedly attached to an upper housing 24 along the elongated back side 16. In the interior 28 of the housing 12, the furnace is divided into a plurality of heating zones 34. Typically, a last zone 35 is a cooling section to cool the product down from the processing temperature before further handling. A conveyor 36 extends the length of the housing between the upper and lower zones. Entry and exit areas 38, 42 for the conveyer are provided on each end of the housing. Product 44 is loaded onto the conveyor belt 36 at the entry area 38 and unloaded at the exit area 42. A system computer 32 is provided to control the process, for example, by controlling conveyor speed and temperature in each zone.

The interior 28 of a heating section of the furnace 10 is shown schematically in FIG. 2. Each upper heating zone 34 comprises a enclosure 48 defining a heating chamber 46 therein. The enclosure 48 is a sealed, substantially leak proof, high temperature resistant box. A plurality of orifices are provided in the lower plate 52 of the box 48. One or more heating elements 56 are mounted in a suitable manner slightly above the orifice plate 52 inside the chamber 46. Any known heating elements suitable for use in a convection furnace, such as electric resistance heating elements, may be used. The heating elements preferably overlie most of the surface area of the orifice plate 52.

The ceiling or upper surface 58 of the box 48 includes an opening therein in which is mounted a gas moving device, shown as a gas amplifier 62. A blower or fan may also be used to move the air. A gas plenum 64 surrounds the box's ceiling 58 and sides 66, 68 generally parallel to the elongated front and back sides 14, 16 of the furnace. The gas amplifier 62 includes an input inlet 72 for connection via a fluid flow line (not shown) to a source of high pressure gas, such as an air compressor or a tank of liquid nitrogen (not shown).

In operation, the gas amplifier 62 or other gas moving device creates a flow of air or other suitable gas into the heating chamber. A diffuser 74 may be mounted inside the box in a suitable manner below the exit of the gas amplifier to distribute the gas flow over the heating elements 56. As the gas flows over the heating elements 56, the gas is heated by convective heat transfer. The heated gas flows through the orifices in the lower orifice plate 52, which direct the flow downwardly to impinge on the product 44 on the conveyor 36 below. Heat is transferred from the gas to the product, causing the preformed solder to melt and flow. The gas is recirculated back to the gas amplifier 62 via the plenum 64.

Each lower heating zone 34 may similarly comprise a substantially leak proof heating chamber 78 located below the conveyor 36. The ceiling or upper plate 82 of the lower heating chamber comprises an orifice plate, typically located directly below the conveyor 36. One or more heating elements 84 are mounted directly below the orifice plate. Air or other gas enters the chamber from an opening 86 in the floor or lower plate of the box, is heated, and rises through the orifices to the product 44 on the conveyor 36. A gas amplifier may be used in the lower heating chamber if desired.

Figure 5:
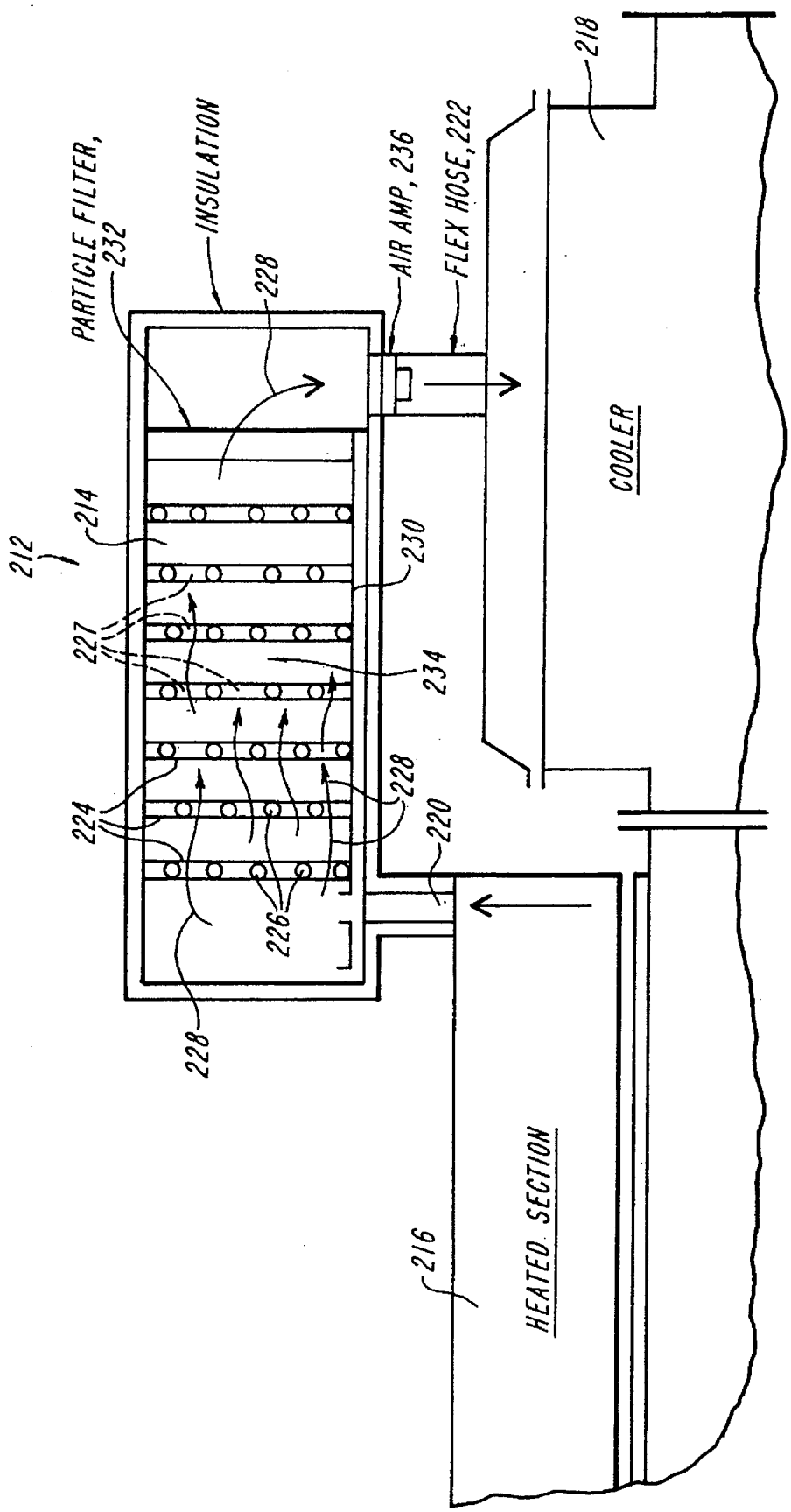
FIG. 5 is a schematic view of a flux collection system according to the present invention.

Referring to FIG. 5, a first embodiment of a flux collection system 212 according to the present invention is shown. The flux collection system comprises a condenser enclosure 214 located on a flow path from a heating section 216 to a cooling section 218 of the furnace. The condenser enclosure 214 is a sealed, substantially leak resistant, insulated box, formed, for example, from a stainless steel or other suitable material. A gas inlet pipe 220 is located at one end of the condenser box to provide a flow path for hot gas from the furnace to the condenser box. A gas outlet pipe 222 is located at the other end of the condenser box to provide a flow path for cooled gas to pass from the condenser box into the cooling section. The outlet pipe may be formed of a flexible hose to accommodate relative movement between the heating and cooling sections of the furnace, such as when the furnace housing of one section is opened up.

Figure 13:
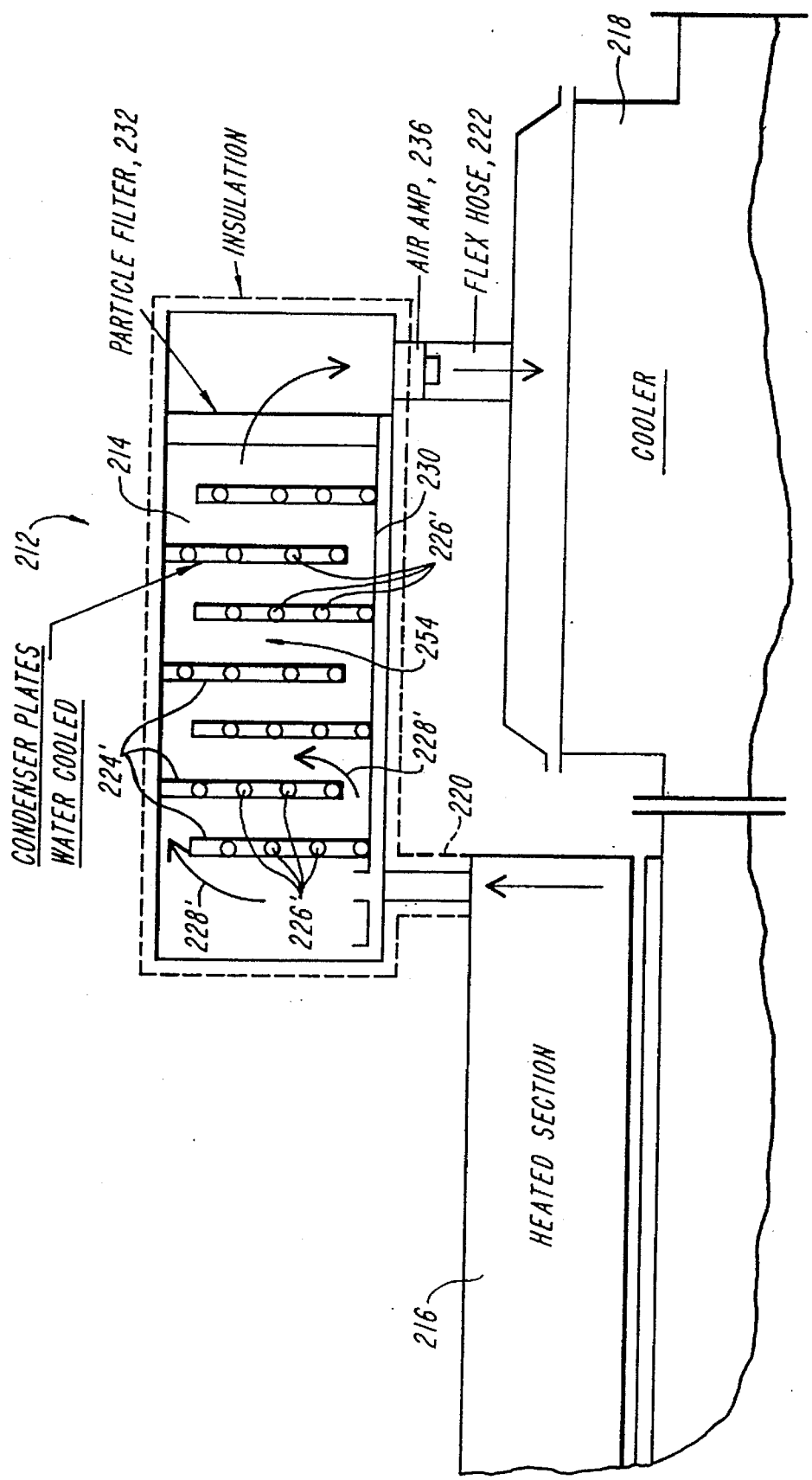
FIG. 13 is a schematic view of a further embodiment of a flux collection system of the present invention.

A plurality of heat exchange elements 224 for cooling the gas are disposed inside the condenser box. The heat exchange elements include internal passages 226 through which a coolant passes. Preferably water is used as the coolant, although any other suitable coolant may be used if desired. Preferably, the heat exchange elements are generally plate-like and have openings 227 therethrough for passage of the furnace gas. The elements are arranged in series generally parallel to one another, providing a flow path through the openings 227, as indicated by arrows 228. The heat exchange elements may includes fins to improve the heat transfer capability, similar to an automotive radiator. Any other type and arrangement of cooling elements may be provided if desired, however. For example, the heat exchange elements may be formed as plates 224' having coolant passages 226' therein and arranged in a staggered pattern to provide a serpentine flow path, indicated by arrows 228 in FIG. 13.

As hot gas from the heating section 216 passes over the surface area of the heat exchange elements 224, the gas is cooled. As the temperature of the gas drops below the condensation temperature of the flux and solvents in the gas, these products condense on the surfaces of the heat exchange elements. A drip tray 230 is also provided below the heat exchange elements to catch any condensates which may drip off the heat exchange elements. A filter 232 is located downstream of the heat exchange elements 224 to collect any particles remaining in the gas stream prior to entering the cooling section 218. The filter media preferably comprises a Kyanite ceramic filter media and is available from Selee Corporation of Hendersonville, N.C. In this manner, a cooled, clean gas stream is available for use in the cooling section of the furnace. Where the furnace uses nitrogen, this reintroduction of the gas yields a substantial savings in usage, as this gas would otherwise be exhausted from the furnace. Additionally, this cool, clean gas substantially lowers the temperature in the furnace product cooling section 35, thereby improving the cooling rate of the product.

Figure 14:
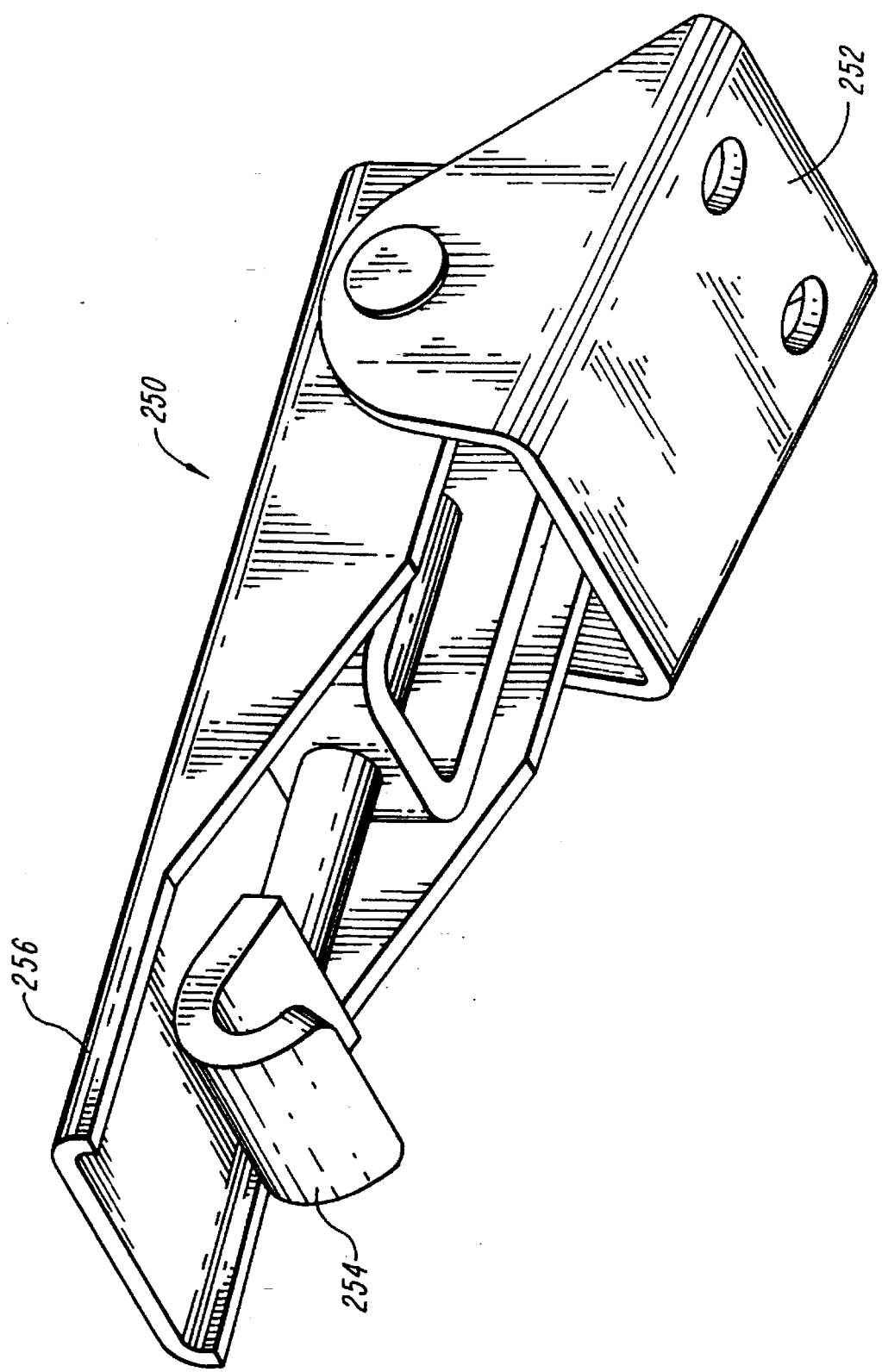
FIG. 14 is a perspective view of a clamping device for use with the flux collection system of FIG. 5 or FIG. 13.

The heat exchange elements 224 are preferably mounted to one side wall 234 of the condenser box 214. This side wall is removably attached to the other walls of the condenser box by a suitable clamping device disposed at, for example, the four corners of the box, as would be known in the art. Preferably, a quick disconnect type of clamping device is used. For example, as shown in FIG. 14, a clamp 250 may be mounted to the box by a fastening plate 252. The clamp includes a hook 254 which catches a lip of the removable side wall and pulls the side wall tightly against the box when the lever 256 is rotated downwardly. A gasket (not shown) is provided around the side wall to maintain a seal when the side wall is attached. In this manner, the cooling plates can be readily removed from the condenser box for cleaning or replacement by disconnecting the clamping device and lifting the removable wall and attached plates out of the box. Any other suitable manner of attaching and removing the cooling elements may be provided, if desired. The drip tray 230 may also be attached to the side wall or may be separately removable for cleaning or replacement. Similarly, the filter 232 is removable for cleaning or replacement with a new filter when it becomes clogged with particles.

A gas moving device 236, such as a gas amplifier, is located along the flow path between the heating section 216 and the cooling section 218 to draw gas from the heating section to the cooling section through the condenser box 214. The gas moving device 236 may be located in any suitable location along this flow path. However, a location downstream of the elements of the flux collection system is preferable to prevent condensation of the flux and solvents on the gas amplifier or other gas moving device. Suitably, the gas amplifier can be located at the entrance to the outlet pipe 222.

Figure 3:
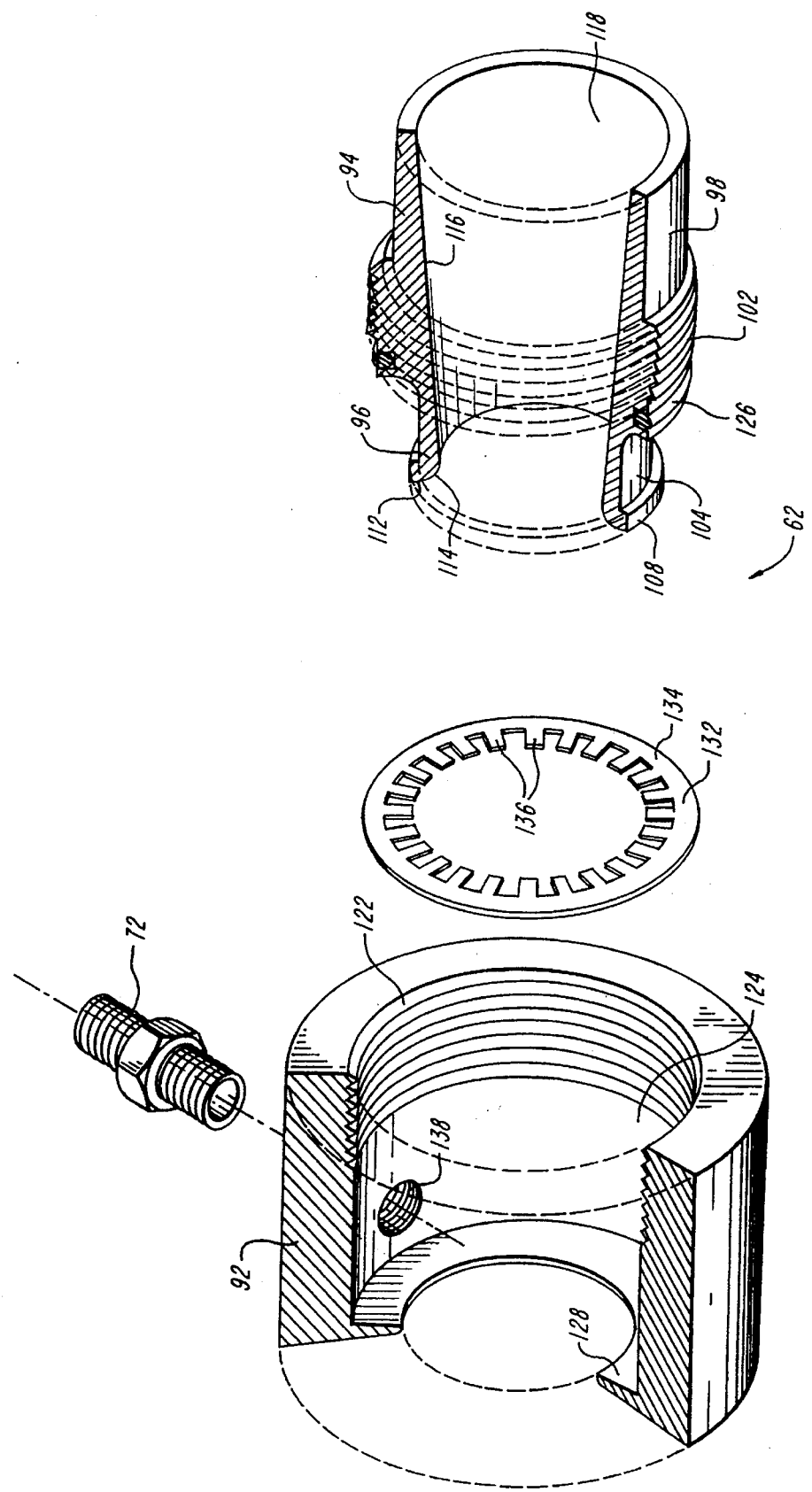
FIG. 3 is an exploded perspective view of a prior art gas amplifier.
Figure 4:
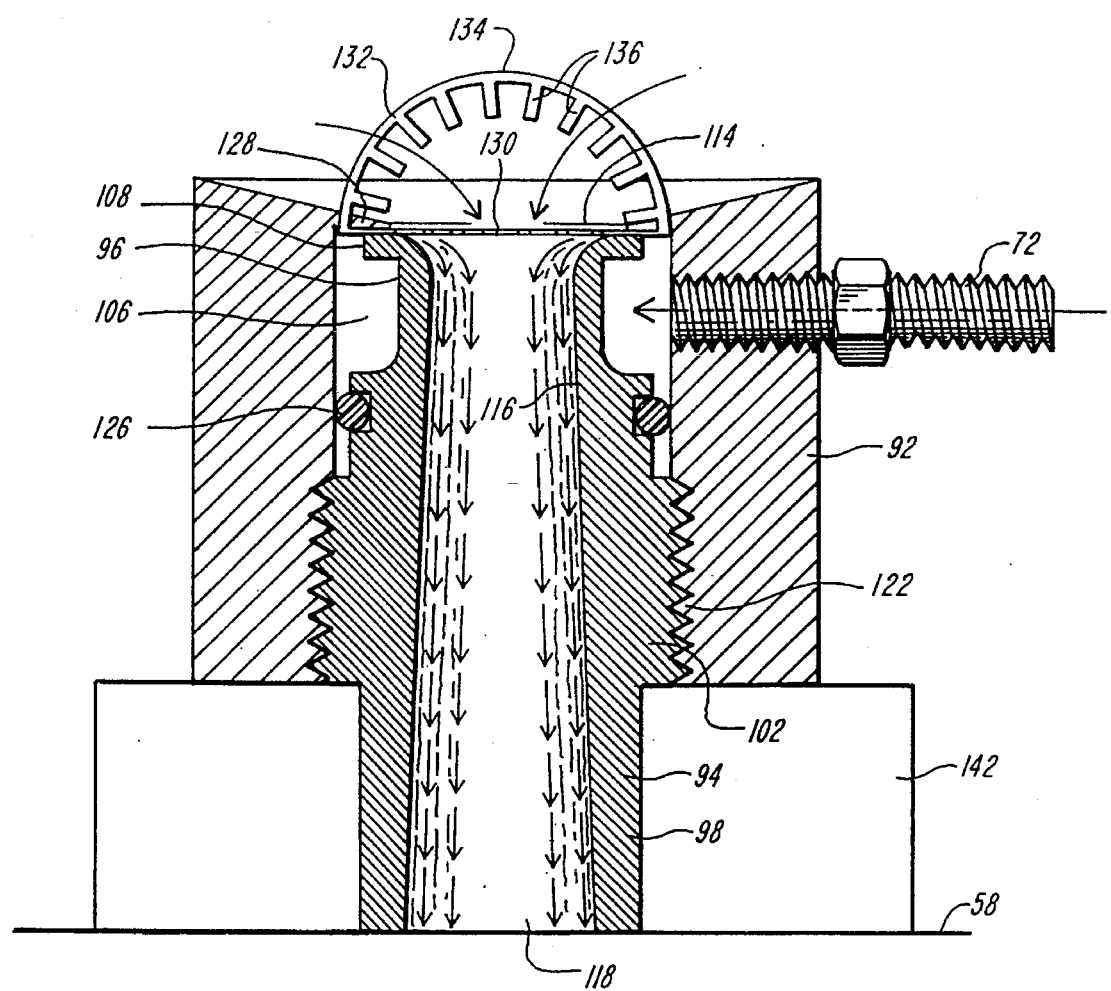
FIG. 4 is a cross-sectional view of the prior art gas amplifier of FIG. 3.

Referring now to FIGS. 3 and 4, a gas amplifier 62 such as may be employed in certain aspects of the present invention comprises a gas amplifier body 92 and a nozzle 94 which fits inside the amplifier body. An annular chamber 106 is formed inside the gas amplifier when the nozzle 94 is inserted into the amplifier body 92. The interior of the nozzle 94 comprises an entrance area 114 having a Coanda surface defined by a Coanda profile which transitions to a bore 116. An O-ring 126, which may be formed from an elastomeric material such as a high density, high temperature rubber, seals the chamber 106. An annular shoulder 128 having a substantially flat surface is provided to correspond to a surface 112 of a lip 108 of the nozzle. A toothed shim 132 is provided which fits between the shoulder 128 and the lip 108. The nozzle 94 is inserted into the amplifier body 92 until the shim 132 abuts the shoulder 128 and the lip 108 to provide a gap 130 therebetween. FIG. 4 illustrates the shim with a 90° bend solely for purposes of clarity.

A gas inlet 72 is provided on the exterior of the body 92 to communicate via a radially disposed passage 138 with the annular chamber 106. A source of compressed gas (not shown) is connected to the inlet 72. The gas flows through the spaces between the teeth 136 of the shim 132 and entrains the gas in the plenum 64 at the upstream end of the gas amplifier to create a flow which follows the Coanda surface of the nozzle entrance area 114 and along the bore 116 of the nozzle to the exit 118. From the exit, the flow enters the heating chamber 46.

Figure 6:
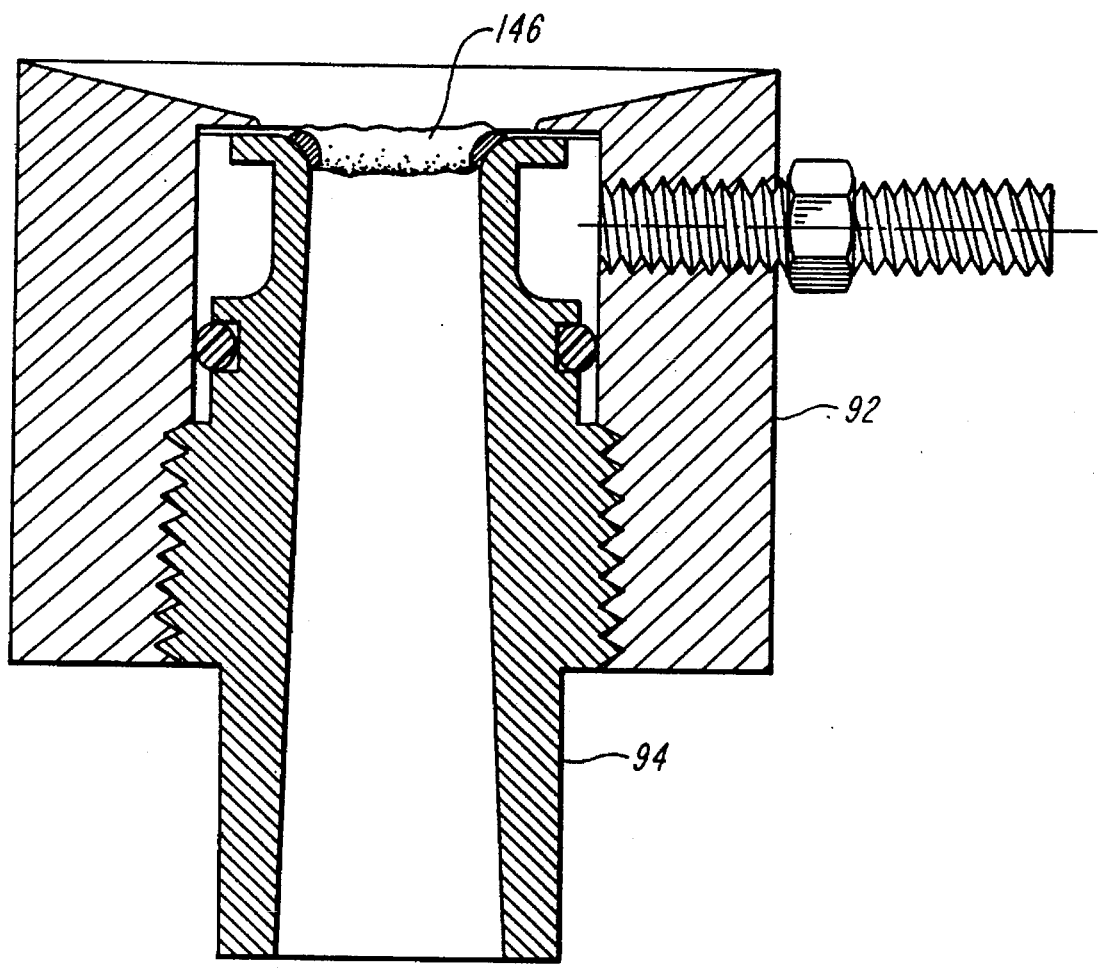
FIG. 6 is a cross-sectional view of a gas amplifier illustrating flux build up.

The compressed input gas flowing through the annular chamber 106 and the gap 130 may be at a temperature below the condensation temperature of the flux circulating in the furnace. The input gas thereby cools the Coanda surface below the flux condensation temperature. As the inflow air in the furnace is entrained at the upstream end of the gas amplifier into the cooler input flow, the flux condenses on the cooler Coanda surface and forms a build up 146, as shown in FIG. 6. As time passes, the condensed flux builds up on the Coanda surface sufficiently to impair the Coanda effect. Eventually, the Coanda flow may break down completely, leading to a reversal of flow from the heating chamber 46 back through the gas amplifier into the plenum 64, since the pressure in the heating chamber is greater than the pressure in the plenum.

According to a further aspect of the present invention, the inflow gas to the gas amplifier is channeled through a conduit prior to entering the gas amplifier. A heat exchanger coil which carries the input or driving fluid for the gas amplifier is located in the conduit in the flow path of the inflow gas so that the inflow gas heats the input gas as the inflow gas flows over the heat exchanger coil. More specifically, referring to FIGS. 7 and 8, the conduit is provided by a box 152 located in the plenum 64 in the recirculating air flow path. The box is generally fabricated from welded sheets of stainless steel, although other materials resistant to high temperatures or other fabrication techniques may be used if desired. The box 152 is illustrated in a generally rectangular configuration, although any desired configuration may be employed. An entrance aperture 154 is provided in an upper surface 156 of the box. Preferably, the entrance aperture 154 is located substantially centrally in the upper surface. Similarly, an exit aperture 158 is provided in a lower surface 160 of the box. Preferably, the exit aperture 158 is also located substantially centrally in the lower surface.

The box 152 is mounted within the plenum 64 in any suitable manner such that the exit aperture is located adjacent to, and preferably in contact with, the inflow entrance area 114 of the gas amplifier 62. The box 152 should be sealed so that the entrance and exit apertures 154, 156 provide substantially the only entry or exit points into or from the box.

A heat exchange coil 164 is disposed within the box 152 in any suitable manner to provide a flow path as discussed further below. The coil may be formed from a copper pipe. The heat exchange coil 164 contains an inlet 166 connected to the gas amplifier input gas source (not shown) and an outlet 168 connected to the input inlet 72 of the gas amplifier 62. The heat exchange coil inlet and outlet are disposed through appropriate sealed apertures in the box 152. Thus, the cooling fluid in the heat exchange coil 164 comprises the driving or input gas to the gas amplifier 62. In a solder reflow furnace, the input gas is generally compressed air or nitrogen, which are typically supplied at room temperature.

Figure 7:
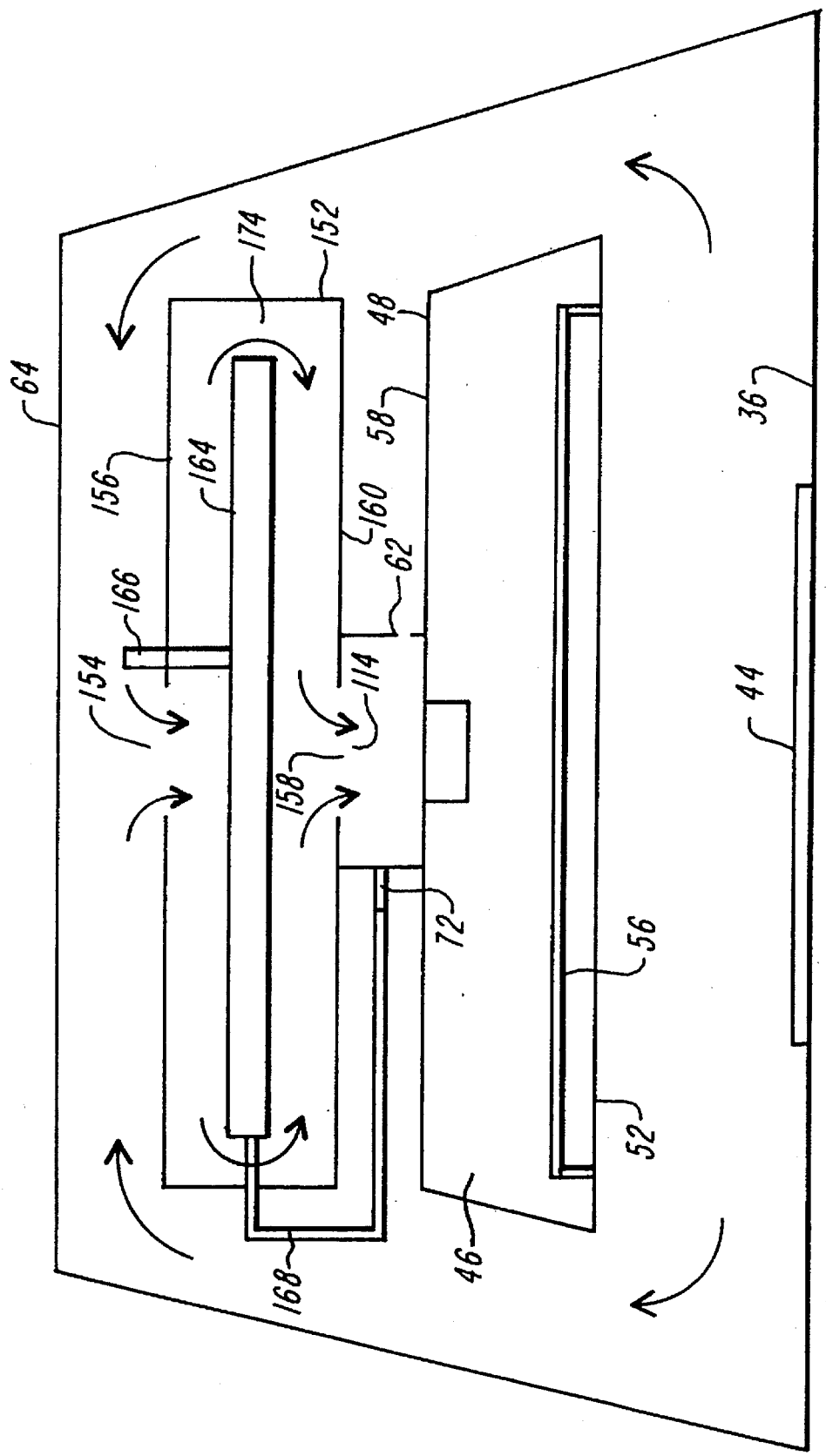
FIG. 7 is a schematic side view of a further flux collection system according to the present invention.
Figure 8:
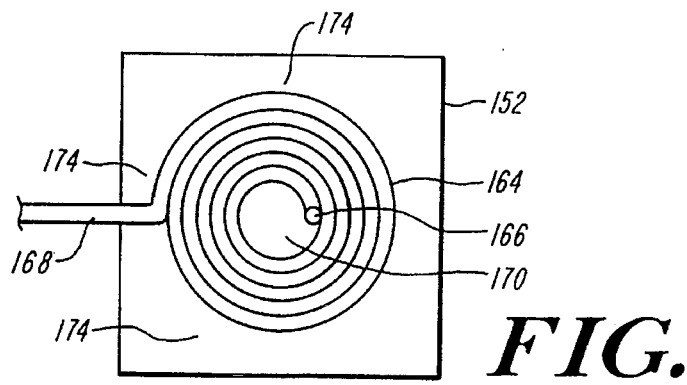
FIG. 8 is a schematic top view of the flux collection system of FIG. 7.

Preferably, the coil 164 is wound in a tight spiral with no spaces between each loop of the spiral, as best seen in FIG. 8. A plate 170, also of copper, is provided in the center of the spiral to block flow therethrough. The spiral is sized to allow some space 174 along the sides of the box for the passage of the recirculating air. With this configuration, a flow path is defined from the entrance aperture 154, across the top of the heat exchange coil 164, down between the sides of the box and the heat exchange coil, across the bottom of the heat exchange coil, and out the exit aperture 158, as indicated by the flow arrows in FIG. 7. In this manner, the recirculating air passes twice over the coil 164, thereby contacting the largest surface area of the heat exchange coil prior to exiting from the box.

In operation, heated gas containing vaporized flux circulates through the plenum 64 and enters the box 152 at the entrance aperture 154. The air travels radially outwardly across the top of the heat exchange coil 164, down the sides, and radially inwardly across the bottom of the heat exchange coil. As the circulating air passes over the heat exchange coil 164, some of the heat removed from the condensed flux is transferred to the input gas within the coil. The input gas is thereby heated to temperatures close to the flux condensation temperature prior to contact with the gas amplifier surfaces. The heated input gas in turn heats the gas amplifier surfaces. Accordingly, the tendency of any remaining vaporized flux to condense on the gas amplifier is further minimized.

In addition, flux in the return gas condenses on the heat exchange coil, such that little or no flux remains in the gas when the gas enters the gas amplifier. Preferably, the coil is wound with the inlet 166 near the center and the outlet 168 at the periphery of the spiral. In this manner, the flux condenses on the coil in a spiral configuration, with the condensation point beginning in the center and moving outwardly.

Figure 9:
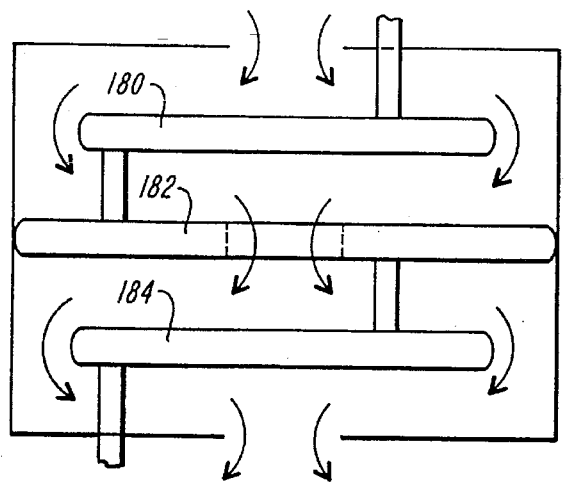
FIG. 9 is a schematic side view of a further embodiment of a flux collection system of the present invention.

The heat exchange coil 164 is shown in FIGS. 7 and 8 as a single coil. However, other variations are contemplated. For example, an array of coils 180, 182, 184 stacked vertically, as shown in FIG. 9, could be provided to define a more serpentine flow path through the box and greater surface area for condensation.

Figure 10:
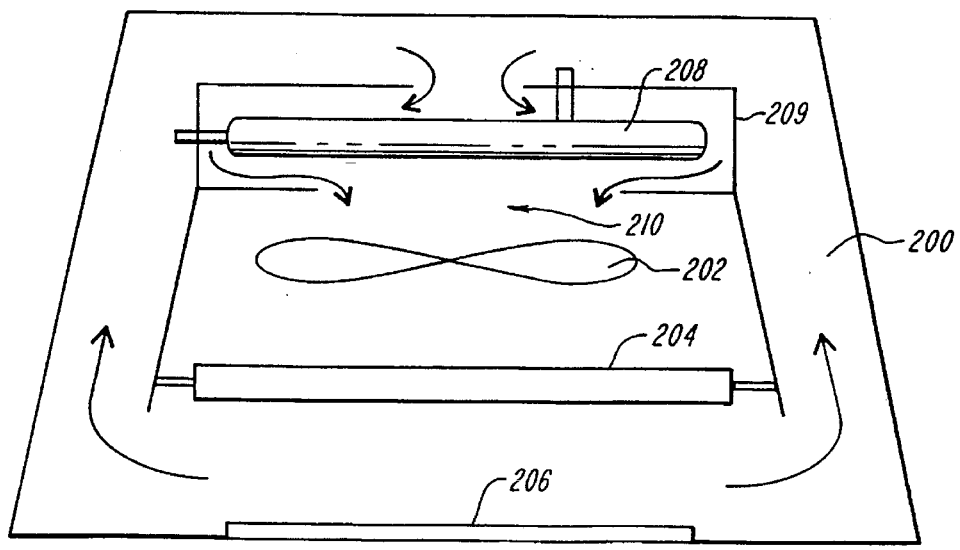
FIG. 10 is a schematic side view of a still further embodiment of a flux collection system according to the present invention.

FIG. 10 illustrates a further embodiment of the invention, in which a fan 202 is employed to circulate air in a solder reflow furnace over a heating element 204 and to the product 206. A heat exchange coil 208 in a box 209, which may be substantially as described above with reference to FIGS. 7 and 8, is located in the recirculation flow path at the entrance 210 to the fan. A separate source of cooling fluid (not shown) is provided in communication with the heat exchange coil 208. In this manner, vaporized flux is condensed on the heat exchange coil 208 before passing through the fan blades.

Figure 11:
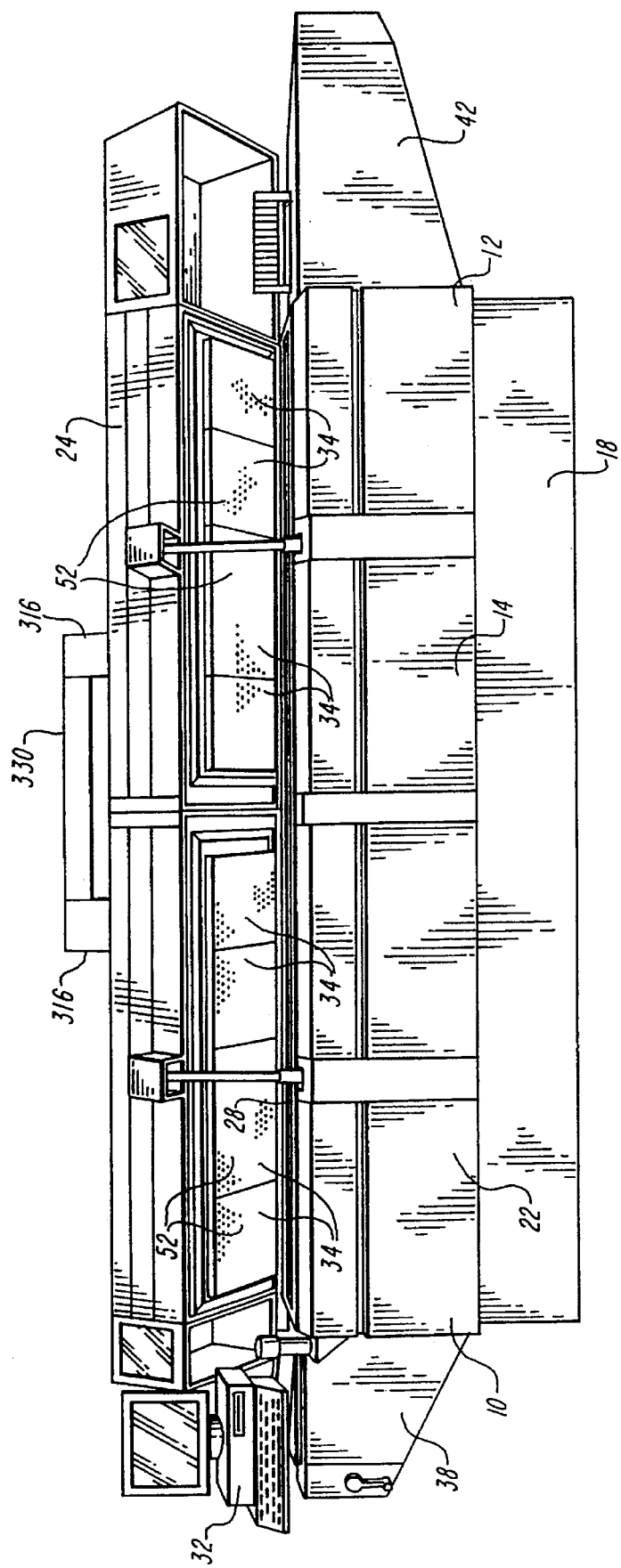
FIG. 11 is a schematic front elevational view of a solder reflow convection furnace employing a densification system according to the present invention.
Figure 12:
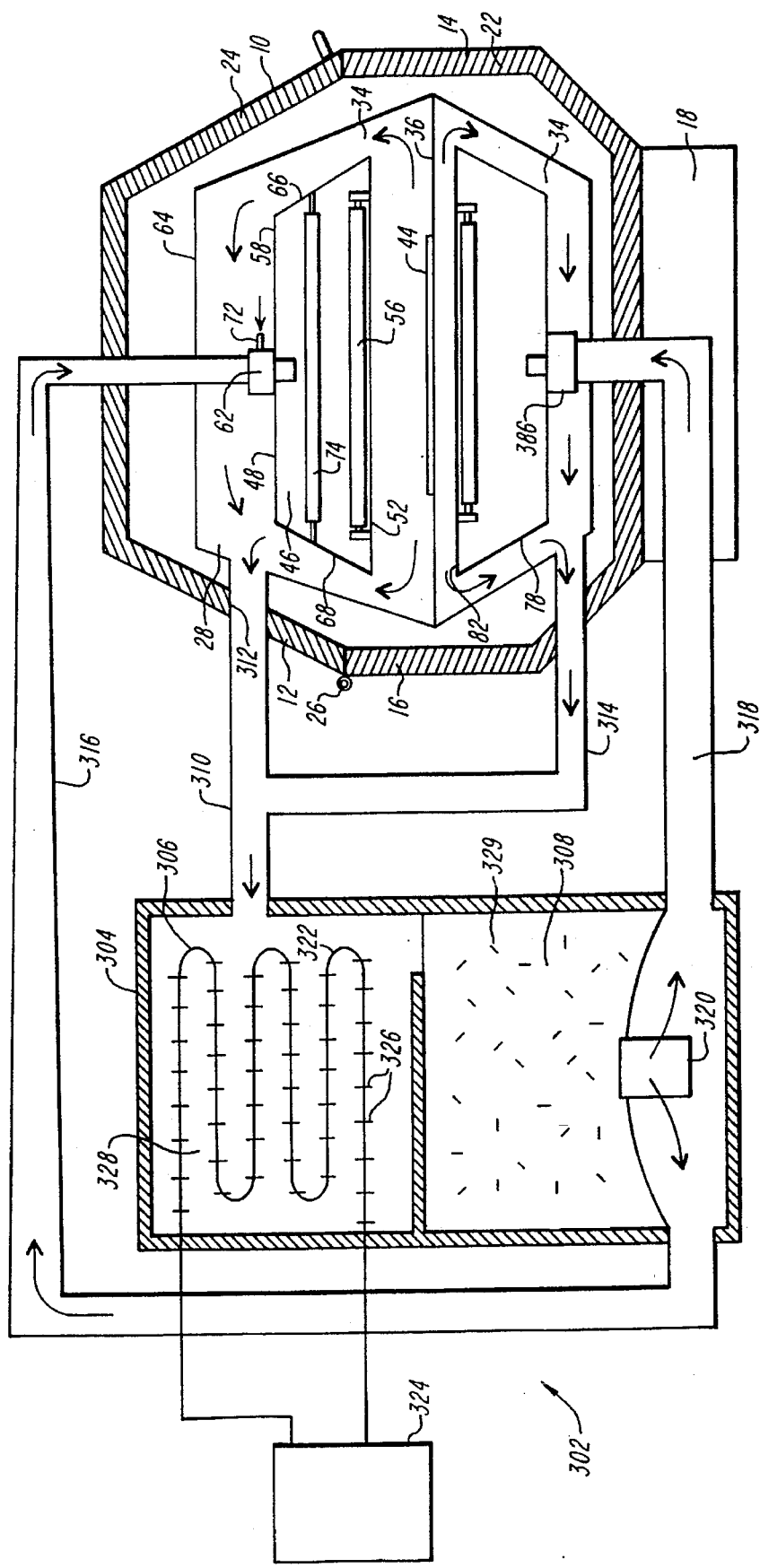
FIG. 12 is a schematic cross-sectional view of the furnace of FIG. 11.

In a further aspect of the invention for use with convection furnaces that employ gas amplifiers, a densification assembly 302, illustrated in FIGS. 11 and 12, is provided in communication with at least one zone 34 of the furnace. The densification assembly comprises an insulated housing 304 in which is disposed a heat exchanger 306 and a filter 308. A flow path through the densification assembly is defined through the heat exchanger to the filter. A blower assembly 320 draws the hot gas from the furnace and pulls the gas through the cooling and filtering system. A duct 310 leads from the plenum 64 through a sealed opening 312 in the housing of the furnace to the densification assembly housing. The duct 310 may include a flexible portion through the sealed opening 312 and the opening may be formed to accommodate opening and closing of the housing, as would be known in the art. A branch 314 of the duct 310 may be provided to lead from the lower heating zone if desired. A return duct 316 leads directly to the inflow entrance of the gas amplifier 62. If a gas amplifier 386 is provided in the lower chamber, a branch 318 may lead directly to the inflow entrance of this gas amplifier. The blower assembly 320 provided in the return duct assists the circulation of the gas.

The heat exchanger 306 comprises a cooling coil 322 which is fed with a cooling fluid from a chiller 324. The cooling coil is preferably formed into a serpentine shape and includes a plurality of fins 326 extending therefrom to increase the heat exchanging surface area. A suitable heat exchanger is model 6320 available from Lytron of Woburn, Massachusetts. The coil is arranged in a compartment 328 in the housing in the flow path of the gas from the furnace so that the gas passes over substantially all of the heat exchanging surface area. Preferably, the coils are arranged in a generally planar configuration disposed vertically within the compartment 328. Spaces between the fins allow the gas to flow in a generally horizontal direction from one side of the plane to the other. As the gas passes over the heat exchanger, the gas cools and substantially all of the vaporized flux and solvents condenses on the surface of the heat exchanger. If the coils are arranged in a generally planar configuration, the condensed flux and solvents tend to build up on the side facing the oncoming flow. At suitable intervals, the heat exchanger is cleaned or replaced with a clean heat exchanger.

The cooled gas next passes downwardly into a compartment 329 of the housing. A filter, such as an organic filter polish, is disposed in the compartment 329. The filter media may comprise activated carbon. A suitable filter is available from Purified Microenvironments of Florida. The filter removes organics and VOCs (byproducts of circuit board processing) as the gas flows through the filter.

As the gas cools by passing across the heat exchanger, its density increases. Upon reentering the heating chamber 46 or 78, the gas is heated, decreasing its density. Since the volume of the heating chamber is fixed, the pressure inside the heating chamber increases. This increase in pressure results in a corresponding increase in velocity output flow to the process area. This increased velocity allows a lower consumption of primary gas, usually nitrogen, and an increase in efficiency of heat transfer. Additionally, the condensing and filtering of the volatiles from the gas stream in the densification assembly 302 minimizes their deposit on components within the furnace.

An example of the reduction in primary gas consumption achievable with gas densification can be illustrated for a given heating chamber volume and orifice plate and furnace zone set point of 250° C. In the absence of gas densification, a typical gas amplifier input flow is 48 liters per minute at 50 psi and 240° C. The output from the heating zone is 49.8 cubic feet per minute and the static pressure in the heating zone is 1 inch of water column. The gain of the gas amplifier is typically 14.

When the gas is cooled to 100° C., it undergoes a density decrease of 22.5% and a volume increase of 50.9%. Upon introduction of the gas at 100° C. into the gas amplifier, the output from the heating zone increases to 75.15 cubic feet per minute, the gas amplifier gain is 21.5, and the static pressure is 2.25 inches of water column. In the absence of densification, the input to the gas amplifier needed to achieve a gain of 21.5 would be 78.8 liters per minute. Thus, densification allows the gas amplifier input to be turned back down, achieving a reduction in the input gas of approximately 48%.

The densification assembly 302 may serve part of a single zone, a complete zone, several zones, or the complete furnace. Its most important use is in zones in which heat spiking occurs, since this is where the greatest consumption of primary gas occurs. A suitable manifold 330, illustrated schematically in FIG. 11, may be provided at the entrance to and exit from the densification assembly housing to direct the gas from more than one zone through the densification assembly.

It will be appreciated that other ways of collecting and heating flux and solvents to reduce the build up from condensed vapors and other ways of densifying recirculating gas are contemplated by the present invention. Similarly, although the invention has been described with reference to a solder reflow convection furnace, the invention may be employed with other convection furnaces in which it is desired to collect volatiles and to conserve primary gas input to a gas amplifier.

The invention is not to be limited by what has been particularly shown and described, except as indicated by the appended claims.

We claim:

1. A solder reflow convection furnace comprising:
a furnace housing having a gas flow path therethrough;
a process heating area located in said furnace housing on said flow path for receiving product having reflowable solder thereon;
a heating assembly to heat gas on said flow path to a temperature above a solder reflowing temperature, said heating assembly located in said furnace housing on said flow path upstream of said process heating area to direct heated gas to the product received in said process heating area to cause reflow of solder; and
a flux collection assembly located on said gas flow path downstream of said process heating area to collect condensed flux, said flux collection assembly comprising a cooling element maintained below a flux condensation temperature and disposed to contact heated gas flowing on said flow path, whereby vaporized flux contacts said cooling element and condenses on said cooling element.

2. The furnace of claim 1, wherein said flux collection assembly includes a further housing, said cooling element disposed within said further housing, an inlet conduit provided from said furnace housing to said further housing, and a return conduit provided from said further housing to said furnace housing.

3. The furnace of claim 2, further including a process cooling area located in said furnace housing and a conveyor assembly disposed to transfer product from said process heating area to said process cooling area, said return conduit located to direct cooled gas to said process cooling area.

4. The furnace of claim 3, wherein said cooling element comprises a plurality of plates having a cooling fluid channel therethrough arranged in a staggered configuration to form a serpentine portion of said gas flow path.

5. The furnace of claim 3, wherein said cooling element is removably mounted within said further housing.

6. The furnace of claim 3, further comprising a drip tray located below said cooling element.

7. The furnace of claim 3, further comprising a filter assembly located downstream of said cooling element in said further housing.

8. The furnace of claim 3, further comprising a gas moving device located on said flow path to direct heated gas from said heating process area through said further housing for cooling and to said process cooling area.

9. The furnace of claim 8, wherein said gas moving device comprises a gas amplifier.

10. The furnace of claim 2 further comprising a gas amplifier in said furnace located to move gas past said heating assembly.

11. The furnace of claim 10, where said cooling element comprises a cooling coil disposed in a serpentine configuration in a generally planar assembly.

12. The furnace of claim 10, wherein said flux collection assembly further includes a filter assembly to remove particulates.

13. The furnace of claim 10, wherein said flux collection assembly further includes a blower assembly located to move gas past said cooling element.

14. The furnace of claim 1, further comprising a device for recirculating gas on said flow path from said heating assembly to said process heating area and back to said heating assembly, said flux collection assembly located upstream of said heating assembly and downstream of said process heating area.

15. The furnace of claim 14, said flux collection assembly further comprising a conduit having an entrance and an exit on said flow path, said exit located adjacent to an entrance to said gas recirculating device, said cooling element comprising a cooling coil disposed within said conduit in a tightly wound spiral configuration.

16. The furnace of claim 15, wherein said gas recirculating device comprises a gas amplifier and said cooling coil includes an outlet in fluid communication with an inlet of said gas amplifier, whereby heat is transferable to fluid in said cooling coil.

17. The furnace of claim 15, wherein said coil in said spiral configuration is located in said conduit to channel gas from said entrance, across a top of said coil, between sides of said conduit and an outer diameter of said coil, and across a bottom of said coil to said exit.

18. A convection furnace comprising:
a thermally insulated housing having a process area and a heating element therein, said housing defining a circulatory gas flow path from said process area to said heating element and back to said process area;

a device for circulating gas on said flow path;

a condensed vapor collector on said flow path upstream from said gas circulating device located to channel substantially all of a gas on said flow path therethrough and to direct substantially all of the gas to said gas circulating device, said condensed vapor collector including an element for collecting as condensation vapor which condenses below a predetermined temperature.

19. The convection furnace of claim 18, wherein said gas circulating device comprises a gas amplifier.

20. The convection furnace of claim 18, wherein said gas circulating device comprises a fan.

21. The convection furnace of claim 18, wherein said vapor collecting element comprises a cooling coil having a cooling fluid therein.

22. The convection furnace of claim 21, wherein said cooling coil has an inlet in communication with a cooling fluid source and located substantially centrally of said coil and an outlet located substantially peripherally of said coil.

23. The convection furnace of claim 22, wherein said gas circulating device comprises a gas amplifier and said cooling coil outlet is in communication with an input flow inlet of said gas amplifier to provide an input flow to said gas amplifier, whereby heat is transferable to the input flow to said gas amplifier.

24. The convection furnace of claim 18, wherein said condensed vapor collector comprises a box having an entrance on said flow path and an exit on said flow path, said exit located adjacent to an entrance to said gas circulating device.

25. The convection furnace of claim 24, wherein said vapor collecting element further comprises a cooling coil disposed within said box in a tightly wound spiral configuration.

26. The convection furnace of claim 25, wherein said gas circulating device comprises a gas amplifier and said cooling coil includes an outlet in fluid communication with an inlet of said gas amplifier, whereby heat is transferable to fluid in said cooling coil.

27. The convection furnace of claim 25, wherein said coil in said spiral configuration is located in said box to channel gas from said entrance, across a top of said coil, between sides of said box and an outer diameter of said coil, and across a bottom of said coil to said exit.

28. The convection furnace of claim 18, wherein said vapor collecting element comprises a plurality of cooling coils.

29. The convection furnace of claim 18, wherein said gas circulating device comprises an air amplifier and said condensed vapor collector is located in a further housing, and further including conduits to direct heated gas from said thermally insulated housing to said further housing and to return cooled gas from said further housing to said thermally insulated housing.

30. The convection furnace of claim 29, wherein said vapor collecting element comprises a cooling coil disposed in a serpentine configuration in a generally planar assembly.

31. The convection furnace of claim 29, wherein said condensed vapor collector further includes a filter assembly for removing particulates.

32. The convection furnace of claim 29, wherein said condensed vapor collector further includes a blower assembly for moving gas on said conduits and through said further housing.

33. The convection furnace of claim 18, wherein said predetermined temperature is a temperature at which solder flux vapor condenses.

34. The convection furnace of claim 18, wherein said furnace comprises a solder reflow furnace.

35. A convection furnace comprising:

a thermally insulated housing;

a sealed, pressurizable heating box mounted inside said housing defining a heating chamber, a heating element disposed inside said box;

a product area inside said housing and located downstream of said heating box to receive heated gas therefrom;

a densification assembly disposed in a flow path between said product area and said heating box to densify gas from said product area; and a gas amplifier mounted in a wall of said heating box downstream of said densification assembly to draw densified gas into said box for circulation over said heating element, whereby pressure in said heating box increases.

36. The convection furnace of claim 35, wherein said densification assembly comprises a heat exchanger to cool gas from said product area.

37. The convection furnace of claim 36, wherein said heat exchanger comprises a cooling coil having a coolant flowable therethrough, said cooling coil being disposed in a serpentine configuration in a generally planar assembly, heat exchange fins extending from said cooling coil, flow passages provided between said fins from one side of said generally planar assembly to another side of said generally planar assembly.

38. The convection furnace of claim 37, wherein said flow passages are generally horizontal.

39. The convection furnace of claim 36, wherein said densification assembly further comprises a filter assembly for removing particulates, said filter assembly being located downstream of said heat exchanger on said flow path.

40. The convection furnace of claim 39, wherein said filter assembly comprises an organic filter polish.

41. The convection furnace of claim 35, further comprising a blower assembly disposed on said flow path downstream of said densification assembly.

42. The convection furnace of claim 35, wherein said convection furnace further comprises a plurality of heating zones, each heating zone defined by an associated sealed pressurizable heating box defining an associated heating chamber, said densification assembly disposed to densify gas provided to at least one of said plurality of heating zones.

43. The convection furnace of claim 35, wherein said heating box includes orifices therein located to direct heated gas to said product area, whereby heated gas flows through said orifices of said heating box and impinges on the product to heat the product.

44. The convection furnace of claim 35, further comprising a conveyor system for transporting product to said product area.

45. The convection furnace of claim 35, wherein a gas plenum is disposed between said housing and said heating box.

46. The convection furnace of claim 35, further comprising a further thermally insulated housing, said densification assembly disposed within said further thermally insulated housing.

47. The convection furnace of claim 35, wherein said furnace comprises a solder reflow furnace.

48. A convection furnace comprising:

a process area;

a pressurizable heating chamber having a heating element therein;

a circulating flow path, said process area and said pressurizable heating chamber being located on said circulating flow path;

a gas amplifier mounted in a wall of said heating chamber to draw gas on said circulating flow path into said heating chamber for circulation over said heating element;

a heat exchanger located on said circulating flow path downstream of said process area and upstream of said pressurizable heating chamber to cool gas on said circulating flow path prior to entering said heating chamber.

49. The convection furnace of claim 48, wherein said heat exchanger comprises a cooling coil having a coolant flowable therethrough, said cooling coil being disposed in a serpentine configuration in a generally planar assembly, heat exchange fins extending from said cooling coil, flow passages provided between said fins from one side of said generally planar assembly to another side of said generally planar assembly.

50. The convection furnace of claim 48, wherein said flow passages are generally horizontal.

51. The convection furnace of claim 48, further comprising a filter assembly for removing particulates, said filter assembly being located downstream of said heat exchanger on said flow path.

52. The convection furnace of claim 51, wherein said filter assembly comprises an organic filter polish.

53. The convection furnace of claim 48, further comprising a blower assembly disposed on said flow path downstream of said heat exchanger.

54. The convection furnace of claim 48, wherein said furnace comprises a solder reflow furnace.

* * * * *

(12) REEXAMINATION CERTIFICATE (4536th)
United States Patent
Soderlund et al.

(10) Number: US 5,611,476 C1
(45) Certificate Issued: Feb. 26, 2002

(54) SOLDER REFLOW CONVECTION FURNACE EMPLOYING FLUX HANDLING AND GAS DENSIFICATION SYSTEMS

(75) Inventors: Martin I. Soderlund, Westborough; Francis C. Nutter, Methuen, both of MA (US); Robert P. Couilliard, Plaistow, NH (US); Pierre J. LeMieux, Andover; Arthur Waugh, Winchester, both of MA (US)

(73) Assignee: BTU International, Inc., North Billerica, MA (US)

Reexamination Request:
No. 90/005,681, Mar. 17, 2000

Reexamination Certificate for:
Patent No.: 5,611,476
Issued: Mar. 18, 1997
Appl. No.: 08/588,101
Filed: Jan. 18, 1996

(51) Int. Cl.[7] .................................................. B23K 3/00
(52) U.S. Cl. ......................... 228/42; 228/223; 228/43; 228/219; 432/23; 432/66; 34/79; 34/469
(58) Field of Search .......................... 228/42, 43, 219, 228/223, 19; 432/23, 66; 34/79, 469; 219/201, 388, 428, 522, 526

(56) References Cited

U.S. PATENT DOCUMENTS

| | | | | |
|---|---|---|---|---|
| 3,604,611 A | * | 9/1971 | Lamberty | 118/429 |
| 3,911,843 A | * | 10/1975 | Stowell | 29/890.042 |
| 4,282,927 A | * | 8/1981 | Simmons | 165/166 |
| 4,393,566 A | * | 7/1983 | Uhlmann et al. | 29/417 |
| 4,909,430 A | * | 3/1990 | Yokota | 228/102 |
| 4,951,401 A | * | 8/1990 | Suzuki et al. | 34/77 |
| 5,232,145 A | * | 8/1993 | Alley et al. | 228/102 |
| 5,328,084 A | * | 7/1994 | Halstead et al. | 228/18 |
| 5,345,061 A | * | 9/1994 | Chanasyk et al. | 219/388 |
| 5,347,103 A | * | 9/1994 | LeMieux | 219/400 |
| 5,475,788 A | * | 12/1995 | Classens et al. | 392/417 |
| 5,579,981 A | | 12/1996 | Matsumura et al. | 228/19 |
| 5,715,990 A | * | 2/1998 | Taniguchi et al. | 228/234.1 |
| 5,951,895 A | * | 9/1999 | Green et al. | 219/388 |

FOREIGN PATENT DOCUMENTS

JP      4-262863      9/1992

* cited by examiner

Primary Examiner—Samuel M. Heinrich

(57) ABSTRACT

A solder reflow convection furnace employing flux collection and heating to minimize flux and solvent build up and gas densification to reduce input gas flow is disclosed. As solder melts in the furnace, an effluent of vaporized flux is driven off and can condense on cooler components. To minimize such condensation, the gas is directed through a cooling system in which the flux condenses, and the cooled, cleaned gas is directed into the furnace's product cooling section. In another embodiment, in which the gas in the furnace is recirculated, a cooling coil is located upstream of the recirculating gas mover to heat the primary gas. The vaporized flux condenses on the cooling coil, which can be readily removed and replaced. In another aspect of the invention, when the furnace employs a gas amplifier, the recirculating gas is cooled prior to reentry into the heating chamber, which increases its density and removes flux by condensation. Upon reentering the heating chamber, the cooler, denser gas undergoes a greater expansion than would return hot gas, thereby increasing the pressure in the chamber and correspondingly increasing the velocity of the output flow to the process area. The increased velocity allows reduction of consumption of the primary gas and increases the efficiency of heat transfer.

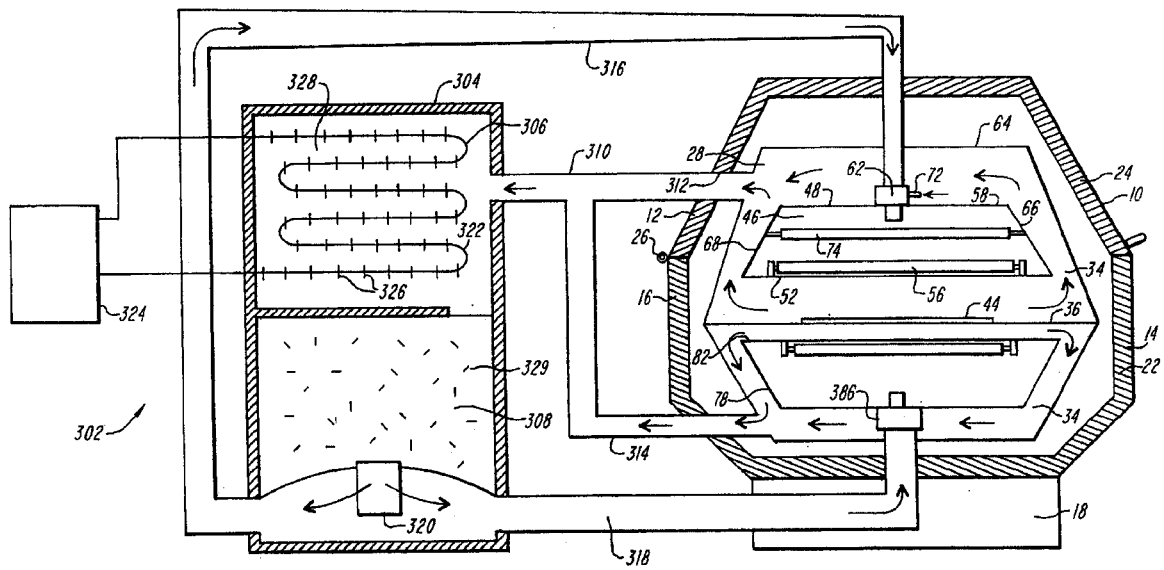

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 10–17 and 35–54 is confirmed.

Claims 3 and 18 are determined to be patentable as amended.

Claims 4–9 and 19–34, dependent on an amended claim, are determined to be patentable.

New claims 55–71 are added and determined to be patentable.

3. [The] *A solder reflow convection* furnace [of claim 2, further including] *comprising:*
   *a furnace housing having a gas flow path therethrough;*
   *a process heating area located in said furnace housing on said flow path for receiving product having reflowable solder thereon;*
   *a heating assembly to heat gas on said flow path to a temperature above a solder reflowing temperature, said heating assembly located in said furnace housing on said flow path upstream of said process heating area to direct heated gas to the product received in said process heating area to cause reflow of solder;*
   *a flux collection assembly located on said gas flow path downstream of said process heating area to collect condensed flux, said flux collection assembly comprising a cooling element maintained below a flux condensation temperature and disposed to contact heated gas flowing on said flow path, whereby vaporized flux contacts said cooling element and condenses on said cooling element;*
   *said flux collection assembly including a further housing, said cooling element disposed within said further housing, an inlet conduit provided from said furnace housing to said further housing, and a return conduit provided from said further housing to said furnace housing; and*
   *a process cooling area located in said furnace housing and a conveyor assembly disposed to transfer product from said process heating area to said process cooling area, said return conduit located to direct cooled gas to said process cooling area.*

18. A convection furnace comprising:
    a thermally insulated housing having a process area and a heating element therein, said housing defining a circulatory gas flow path from said process area to said heating element and back to said process area;
    a device for circulating gas on said flow path;
    a condensed vapor collector on said flow path upstream from said gas circulating device located to channel substantially all of a gas on said flow path therethrough and to direct substantially all of the gas to said gas circulating device, said condensed vapor collector including an element for collecting as condensation vapor which condenses below a predetermined temperature, *the vapor collecting element comprising at least two spaced cooling elements maintained below a flux condensation temperature and disposed to define a reversal of direction of said flow path past said cooling elements.*

*55. The furnace of claim 1, further comprising a filter assembly located on said gas flow path downstream of said cooling element.*

*56. The furnace of claim 55, wherein said gas flow path includes a return path from said filter assembly directly to said process heating area.*

*57. The furnace of claim 1, further comprising a heating zone including said process heating area and said heating assembly, said gas flow path circulating through said heating zone.*

*58. The furnace of claim 1, further comprising a process cooling area located in said furnace housing and a conveyor assembly disposed to transfer product from said process heating area to said process cooling area, said process cooling area located on said gas flow path downstream of said flux collection assembly.*

*59. The furnace of claim 1, further comprising a system computer operative to control said heating assembly to provide reflowing of solder for surface mounting electronic components to circuit boards.*

*60. The furnace of claim 18, further comprising a plurality of zones, at least one of said zones comprising a heating zone housing said process area and said heating element, at least another of said zones comprising a cooling zone.*

*61. The furnace of claim 60, wherein said circulatory gas flow path circulates through said heating zone.*

*62. The furnace of claim 18, further comprising a system computer operative to control said heating element to provide reflowing of solder for surface mounting electronic components to circuit boards.*

*63. A solder reflow convection furnace for the reflowing of solder in the surface mounting of components to circuit boards, comprising:*
   *a thermally insulated furnace housing having a gas flow path therethrough, and a conveyor extending from an entry area to an exit area of said furnace housing;*
   *a plurality of process zones within said furnace housing, at least one zone comprising a heating zone, at least a further zone comprising a cooling zone;*
   *said heating zone comprising a process heating area for receiving product having surface mountable components and reflowable solder thereon;*
   *a convection heating assembly in said heating zone to heat gas on said flow path to a temperature above a solder reflowing temperature, said convection heating assembly located in said furnace housing on said flow path upstream of said process heating area to direct heated gas to impinge on the product received in said process heating area to cause reflow of solder;*
   *a flux collection assembly located on said gas flow path downstream of said process heating area to collect condensed flux, said flux collection assembly comprising a further housing and a cooling element disposed within said further housing, said cooling element maintained below a flux condensation temperature and* disposed to contact heated gas flowing on said flow path, whereby vaporized flux contacts said cooling element and condenses on said cooling element; and a filter assembly located on said gas flow path downstream of said cooling element.

64. The furnace of claim 63, further comprising a system computer operative to control said convection heating assembly to provide reflowing of solder for surface mounting electronic components to circuit boards.

65. The furnace of claim 63, wherein said gas flow path circulates through said heating zone.

66. A solder reflow convection furnace comprising:

a multiple zone furnace housing having a gas flow path therethrough;

a conveyor for transporting surface mounted components through said multiple zones of said furnace housing;

a process heating zone located in said furnace housing on said gas flow path for receiving surface mounted components having reflowable solder thereon;

a convection heat source in said process heating zone for heating said reflowable solder;

said convection heat source comprising an orifice plate and a heater disposed above said orifice plate;

a gas moving device for moving heated gas through said orifice plate onto said surface mounted components; and a flux collection assembly located on said gas flow path downstream of said process heating zone to collect condensed flux, said flux collection assembly comprising a cooling element maintained below a flux condensation temperature and disposed to contact heated gas flowing on said flow path, wherey vaporized flux contacts said cooling element and condenses on said cooling element.

67. The solder reflow convection furnace of claim 66, further comprising a filter assembly located on said gas flow path downstream of said cooling element.

68. A solder reflow forced convection furnace comprising:

a multiple zone furnace housing having a gas flow path therethrough;

a conveyor for transporting surface mounted components through said multiple zones of said furnace housing;

a first process heating zone located in said furnace housing on said gas flow path for receiving surface mounted components having reflowable solder thereon;

a forced convection heat source in said first process heating zone for heating said reflowable solder to below solder reflow temperature;

a flux collection assembly located on said gas flow path downstream of said first process heating zone to collect flux,;

a second process heating zone located in said furnace housing downstream from said first process heating zone for heating said reflow solder to above solder reflow temperature;

the heating of said first process heating zone being independently operable, the heating of said second process heating zone being independently operable.

69. The furnace of claim 59, wherein the system computer is operative to control the heating assembly to heat gas to a temperature less than a temperature damaging to printed circuit boards.

70. The furnace of claim 1, wherein the flux collection assembly is operative to collect condensed flux from solder reflow of printed circuit boards.

71. The furnace of claim 1, wherein the process heating area contains an atmosphere suitable for reflow soldering of printed circuit boards.

* * * * *